(12) United States Patent
Haverkamp (10) Patent No.: US 10,345,101 B2
(45) Date of Patent: Jul. 9, 2019

(54) DEVICE AND METHOD FOR CALIBRATING A COORDINATE-MEASURING DEVICE

(71) Applicant: CARL ZEISS INDUSTRIELLE MESSTECHNIK GMBH, Oberkochen (DE)

(72) Inventor: Nils Haverkamp, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 235 days.

(21) Appl. No.: 14/894,118

(22) PCT Filed: May 27, 2013

(86) PCT No.: PCT/EP2013/060876
§ 371 (c)(1),
(2) Date: Nov. 25, 2015

(87) PCT Pub. No.: WO2014/191016
PCT Pub. Date: Dec. 4, 2014

(65) Prior Publication Data
US 2016/0131476 A1    May 12, 2016

(51) Int. Cl.
*G01B 21/04* (2006.01)
*G01B 1/00* (2006.01)

(52) U.S. Cl.
CPC ............ *G01B 21/042* (2013.01); *G01B 1/00* (2013.01)

(58) Field of Classification Search
CPC .................................. G01B 21/042; G01B 1/00
(Continued)

(56) References Cited

U.S. PATENT DOCUMENTS

| 3,869,799 A | * | 3/1975 | Neuer | B23Q 1/36 33/23.11 |
| 4,738,131 A | * | 4/1988 | Euverard | G01B 5/066 29/454 |

(Continued)

FOREIGN PATENT DOCUMENTS

| CN | 101868691 A | 10/2010 |
| CN | 102538727 A | 7/2012 |

(Continued)

OTHER PUBLICATIONS

Gross, H., et al., "Characterization of Complex Optical Systems Based on Wavefront Retrieval from Point Spread Function", Detectors and Associated Signal Processing II. (2005), pp. 359-370, Edited by Chatard, Jean-Pierre; Dennis, Peter N. J. Proceedings of the SPIE, vol. 5965.

(Continued)

*Primary Examiner* — Robert R Raevis
(74) *Attorney, Agent, or Firm* — Laurence A. Greenberg; Werner H. Stemer; Ralph E. Locher (57) ABSTRACT

A device calibrates a coordinate-measuring device. The device contains at least one calibrating element and the calibrating element has a plurality of surface sections. The surface sections that butt against each other form an edge. The device further contains at least one retaining device and the calibrating element is arranged on a surface section of the retaining device. The surface sections of the calibrating element are arranged in relation to each other in such a manner that the calibration element has at least one edge that does not overlap any other edge of the calibrating element when the edges are projected into a common projection plane. The projection plane is oriented orthogonally to a normal vector of the surface section of the retaining device.

22 Claims, 5 Drawing Sheets

(58) Field of Classification Search
USPC ...... 356/243.1, 243.4, 243.8, 243.7; 73/1.79, 73/1.81, 1.86
See application file for complete search history.

(56) References Cited

U.S. PATENT DOCUMENTS

| | | | |
|---|---|---|---|
| 5,285,397 | A | 2/1994 | Heier et al. |
| 5,501,096 | A * | 3/1996 | Stettner ................ G01B 21/042 33/503 |
| 7,142,313 | B2 | 11/2006 | Ishitoya et al. |
| 7,918,033 | B2 | 4/2011 | Held |
| 8,416,412 | B2 | 4/2013 | Schellhorn et al. |
| 8,804,905 | B2 | 8/2014 | Christoph et al. |
| 8,826,719 | B2 | 9/2014 | Weekers et al. |
| 2001/0045021 | A1 * | 11/2001 | Matsuda ............. G01B 21/042 33/502 |
| 2002/0157449 | A1 * | 10/2002 | Asanuma ............ G01B 21/042 73/1.79 |
| 2004/0141187 | A1 | 7/2004 | Johnston et al. |
| 2006/0266100 | A1 * | 11/2006 | McMurtry .............. G01B 3/30 73/1.79 |
| 2009/0094847 | A1 | 4/2009 | Clifford |
| 2009/0161122 | A1 | 6/2009 | Boyer et al. |
| 2009/0248345 | A1 * | 10/2009 | Jonas ................... G01B 21/042 702/94 |
| 2010/0206040 | A1 * | 8/2010 | Ebara ................... G01B 21/042 73/1.79 |
| 2010/0319207 | A1 * | 12/2010 | Held ................... G01B 21/042 33/503 |
| 2012/0151988 | A1 * | 6/2012 | Weekers ................. G01B 1/00 73/1.79 |

FOREIGN PATENT DOCUMENTS

| | | |
|---|---|---|
| DE | 3941144 A1 | 6/1991 |
| DE | 19720821 A1 | 11/1998 |
| DE | 102005018447 A1 | 10/2006 |
| DE | 102005026022 A1 | 12/2006 |
| DE | 102005033187 A1 | 1/2007 |
| DE | 102008024808 B3 | 11/2009 |
| DE | 102008028986 A1 | 12/2009 |
| EP | 1703251 A2 | 9/2006 |
| WO | 2008055589 A2 | 5/2008 |

OTHER PUBLICATIONS

Keferstein, C., et al., "Universal high precision reference spheres for multisensor coordinate measuring machines" CIRP Annals—Manufacturing Technology, 2012, pp. 487-490, vol. 61, No. 1.

* cited by examiner

DEVICE AND METHOD FOR CALIBRATING A COORDINATE-MEASURING DEVICE

BACKGROUND OF THE INVENTION

Field of the Invention

The invention relates to an apparatus and to a method for calibrating a coordinate-measuring machine.

In dimensional metrology, measuring ability verification, in particular accuracy verification, must be produced for the use of a coordinate-measuring machine. In industrial metrology, objects to be measured, for example workpieces, are typically three-dimensional bodies. For tactile three-dimensional metrology using coordinate-measuring machines, a calibration is described for example in DIN EN ISO 10360.

In addition to tactile metrology, i.e. metrology based on mechanical contact-probing, there are also optical measuring techniques in which a measurement object is optically measured. For these optical measurement techniques, however, only two-dimensional calibration methods exist in the micrometer accuracy range, which methods are known for example from the semiconductor industry. For optical coordinate-measuring machines, known three-dimensional calibration methods have the disadvantage that, in particular for three-dimensional measurements, relating the results to legal primary standards is effected not directly, but mostly indirectly.

US 2009/0161122 A1 discloses a measurement body for use in a method for assessing a three-dimensional measurement accuracy of a coordinate-measuring machine. The measurement body has a pyramid shape having four vertical surfaces, four inclined surfaces and one planar top surface.

DE 10 2008 028 986 A1 relates to a retaining device for retaining a calibration body for calibrating a measurement sensor of a coordinate-measuring machine. The retaining device has an adjustment device that is configured to adjust, via actuation by a user, in particular via rotation of a rotatable part, an alignment of the calibration body that is retained on the retaining device.

DE 10 2005 033 187 A1 discloses a method for calibrating a measurement arrangement that generates images of measurement objects using invasive radiation. The document also discloses a calibration object for calibrating this measurement arrangement, wherein the calibration object has at least a calibration element having a ball surface and/or a calibration element the surface of which forms at least part of a ball surface.

DE 10 2005 026 022 A1 discloses a coordinate-measuring machine having an optical sensor which contactlessly probes an object to be measured. Systematic measuring errors which are dependent, in terms of their magnitude, on the angular inclination between sensor measuring axis and material surface are corrected by previously storing the deviation by measuring a standard in the coordinate-measuring machine when determining the deviation so as to take it into account subsequently in a corrective fashion when measuring workpieces with the sensor. The document also discloses a ball standard.

DE 197 20 821 A1 discloses a calibration standard for probes operating optically in contacting and contactless fashion, which calibrating standard consists of a body having one or more partial surfaces, wherein the body and its surfaces are made from a solid material. The body is distinguished by the fact that the surfaces of the body have sufficient dimensional stability and wear resistance and that at least the material of the surfaces of the body largely absorbs, transmits or only weakly reflects radiation that is incident on the body starting from an optical probe.

DE 10 2005 018 447 A1 discloses the measurement of an object with a coordinate-measuring machine, wherein measurements can be carried out using a tactile and/or optical sensor system. The document also discloses that during the tomography procedure, in principle a calibration body, in particular an arrangement of balls, is tomographed as well and, on this basis, the relative position of the rotary axis to the coordinate-measuring machine and/or to the x-ray source and/or to the x-ray sensor is determined and subsequently mathematically corrected.

BRIEF SUMMARY OF THE INVENTION

There is the technical problem of providing a method and an apparatus for calibrating a coordinate-measuring machine, in particular a coordinate-measuring machine having at least one optical and at least one tactile sensor, which enable reliable and highly accurate calibration of the coordinate-measuring machine.

The technical problem is solved by the subject matters with the features of the main claims. Further advantageous embodiments of the invention can be gathered from the dependent claims.

It is a basic idea of the invention to provide an apparatus for calibrating a coordinate-measuring machine which enables highly accurate optical measurement, in particular highly accurate and unique image-based feature detection, for a multiplicity of optical sensors and illumination scenarios.

Proposed is an apparatus for calibrating a coordinate-measuring machine. The coordinate-measuring machine can be in particular what is known as a multisensor coordinate-measuring machine, which enables three-dimensional measurement of a measurement object using at least one optical sensor and one tactile sensor.

When measuring the measurement object using a tactile sensor, coordinates of the measurement object are determined by way of contact-probing surfaces of the measurement object using the tactile sensor, in particular a probing element, in particular a probe ball, which may be part of a probe head. When optically measuring the measurement object, images of the measurement object are generated by an optical sensor, wherein measurement, i.e. the determination of dimensions, takes place by way of methods of image processing. Suitable image features can be detected and evaluated here.

The apparatus comprises at least one calibration element. A calibration element refers in this case to an element having previously known geometric dimensions. The calibration element is preferably related to a legal primary standard, i.e. calibrated against a standard.

The calibration element has a plurality of surface sections, where mutually abutting surface sections form an edge. At the transition of mutually abutting surface sections, a jump-type change of a normal vector occurs at the edge, wherein the normal vector is oriented orthogonally to the respective surface section. A ball-type calibration element, in particular, thus has no edges.

The calibration element preferably comprises a plurality of planar, in particular only planar, surface sections. These surface sections can form, for example, lateral faces of the calibration element.

According to the invention, the apparatus comprises at least one retaining apparatus, wherein the calibration element is arranged on a surface section of the retaining apparatus. The calibration element is arranged in particular on a planar surface section of the retaining apparatus. It is thus possible for a planar surface section of the calibration element to be arranged on a planar surface section of the retaining apparatus. The calibration element and the retaining apparatus can here be mechanically connected in releasable or non-releasable fashion. The calibration element and the retaining apparatus can be adhesively bonded, for example. However, other mechanical connection methods are of course also conceivable.

The surface sections of the calibration element are furthermore arranged with respect to one another such that the calibration element has at least one edge which does not overlay with any other edge of the calibration element when the edges of the calibration element are projected into a common projection plane. The projection plane is here also oriented orthogonally to a normal vector of the surface section of the retaining apparatus. If the surface section of the retaining apparatus on which the calibration element is arranged is a planar surface section, the normal vector is a normal vector of said planar surface section. However, if the surface section of the retaining apparatus on which the calibration element is arranged, for example, a curved surface section, the normal vector can be a normal vector of a tangential plane at a point or a straight line at which the calibration element is connected to the retaining apparatus.

Owing to the arrangement and configuration of the calibration element according to the invention, the at least one edge in the projection plane is uniquely identifiable since no other edge overlays it. If the projection plane is, for example, an image plane of an optical sensor, the at least one edge is imaged uniquely into the image plane.

The term "overlay" here means that at least two partial sections of two edges are projected into the common projection plane with the same position and orientation. "Overlay" in particular means that the positions and orientations of partial sections of edges in the common projection plane correspond to one another such that endpoints and/or a profile of a specific edge in the projection plane is/are not uniquely detectable or identifiable. The partial sections can here have a predetermined length. The term partial section does not necessarily designate a point of an edge. It may thus be non-detrimental if edges in the projection plane intersect in a point.

The projection here designates a parallel projection, the projection direction of which is oriented parallel to the previously explained normal vector. The calibration element can, in particular, be configured and arranged on the retaining apparatus such that a predetermined number of or even all edges at which at least two surface sections of the calibration element abut do not overlay one another in the common projection plane. It is of course possible, as will be explained below, for the retaining apparatus to be configured such that none of the edges of the retaining apparatus overlays at least one edge of the calibration element in the common projection plane.

The fact that the edge overlays with no other edge thus also means that the edge is uniquely identifiable in the projection plane, in particular the position and orientation thereof.

The proposed configuration and arrangement of the calibration element and of the retaining apparatus advantageously enable unique imaging in particular of edges of the calibration element. It is thus possible in particular for an optical measurement of the calibration element that is based on edge detection to be improved. Since edges delimit surface sections and dimensions of said surface sections of the calibration element are known, it is possible on this basis to determine a relationship, for example a conversion factor, between an image-based, for example pixel-based, dimension of the surface section and an actual dimension of the surface section.

This relationship then enables the calibration of the optical sensor, since a highly accurate association of image-based determined dimensions with actual dimensions is made possible. The proposed apparatus thus makes possible a high measurement accuracy in optical measurement.

In one further embodiment, two mutually different surface sections, in particular planar surface sections, intersect under an acute angle. The acute angle here designates the angle enclosed by the surface sections in the interior or in the interior volume of the calibration element. If the previously explained normal vector extends parallel to a normal vector of one of these surface sections, the result is advantageously that the edge formed by the two described surface sections is projected uniquely into the common projection plane. The unique projection cannot take place in particular if the surface sections intersect at a right angle and the normal vector is oriented parallel to one of the surface sections. In particular, a plurality of or even all surface sections of the calibration element can intersect under an acute angle. The calibration element can be configured for example in the shape of a tetrahedron.

In one preferred embodiment, the acute angle lies in an angle range of 0° to less than 90°. The angle is thus greater than 0° and less than 90°. The angle is preferably close to 90°, for example it may be greater than 80° or greater than 85°.

This is advantageous because not too much of an undercut is necessary, which would be difficult to manufacture for material reasons. Also avoided due to undercuts that are not too pronounced is what is known as shaft contact-probing in tactile measurement of the corresponding surface section. Pivoting of a probe head or a probe element, for example a probe ball, which may become necessary during the tactile measurement, is thus advantageously avoided.

Since an edge that is formed by two planes which are oriented perpendicular to one another can be readily determined in image-based fashion, what advantageously follows is a best possible image-based determinability of the edge, as previously explained, while unique determinability is ensured at the same time.

In one further preferred embodiment, the calibration element is configured in the form of a truncated pyramid. The calibration element can in this case have a triangular or quadrilateral base area or a base area having more than four sides. It is possible in particular for the calibration element in the form of a truncated pyramid to be arranged at the retaining apparatus such that a cross-sectional area of the calibration element increases in the direction of the previously explained normal vector, wherein the cross-sectional area is oriented orthogonally to the normal vector. The base area of the calibration element in the form of a truncated pyramid can thus form a top surface of the calibration element in the normal direction.

This advantageously makes possible mechanical manufacturing of the calibration element that is as simple as possible.

In one further embodiment, the calibration element has previously known optical properties. The optical properties of the calibration element here comprise some or preferably all properties of the calibration element by which the latter interacts with electromagnetic radiation, in particular light.

Optical properties can for example also be structural properties of the calibration element or be dependent on said structural properties.

The previously known optical properties permit a calculation-based determination of the interaction of the calibration element with light. If the previously known optical properties are known, a virtual image of the calibration element can thus be calculated, i.e. simulated.

The optical properties in particular permit a simulation of electromagnetic interactions between the calibration element and electromagnetic radiation. It is possible in this way to advantageously carry out what is known as a rigorous optical simulation.

Optical properties here arise from structural properties and a geometric construction, for example. Optical properties can thus arise in particular from a material or a material composition, a surface texture, a surface quality, a surface topography, an electrical conductivity and other properties of the calibration element.

Further properties that influence optical properties can comprise for example absorption properties, reflection properties, a refractive index, a homogeneity of the material and/or of the material properties and an isotropy of the material and/or of the material properties.

In one further embodiment, diffusing properties and/or diffraction properties and/or reflection properties and/or transmission properties of the calibration element are previously known. These are here included in the previously explained optical properties of the calibration element. The previously mentioned properties can here be determined for example in dependence on a material or a material composition of the calibration element. For a simulation of the propagation of an electromagnetic wave, for example for the simulation of a transmission, it is possible for the spatially and directionally dependent and wavelength-dependent complex refractive index with a wavelength-dependent real part and a wavelength-dependent imaginary part to be taken into account.

This approach advantageously makes it possible to take into account, as fully as possible, manufacturing, installation, environmental and operating influences, among others, for example, temperature, humidity, air pressure, and stress introduced into the material.

A suitably selected material can simplify the previously explained simulation. For example, for homogeneous materials, the spatial dependence of the refractive index is omitted. For isotropic materials, for example, the directional dependence is omitted.

The previously mentioned properties advantageously make it possible to calculate the interaction of the calibration element with electromagnetic radiation, in particular light, as accurately as possible.

In one further embodiment, the calibration element consists of an isotropic material.

This enables the interaction of the calibration element with electromagnetic radiation, in particular light, to be calculated as simply as possible.

It is of course also possible for the calibration element to consist of an anisotropic material or anisotropic material composition. In this case, the dependence of a property on the direction is preferably previously known. The property to which the isotropy or anisotropy relates can be in particular an optical property.

In one further embodiment, the calibration element consists of non-conductive material. This also includes materials having low conductivity. The calibration element can be configured for example as a non-conductor or insulator having a conductivity of less than $10^{-8}$ S/m.

Such a calibration element advantageously enables a simplified calculation of the interactions of the calibration element with electromagnetic radiation, in particular light.

Generation or simulation of virtual images of the calibration element advantageously enables the optimization of the image-based measurement. Due to the simulation it is thus possible for imaging effects to be simulated, which in the actual optical imaging makes image-based measurement more difficult. Knowing the simulated imaging effects can then increase the accuracy of the image-based measurement, since owing to said imaging effects measurement inaccuracies that arise from these imaging effects can be compensated for.

In one further embodiment, the calibration element has a predetermined mechanical hardness. Here the hardness designates a mechanical resistance exhibited by the calibration element against mechanical intrusion of a harder test body. The calibration element can, for example, be configured such that deformations of the calibration element due to contacting-probing with a force that is less than or equal to a maximum force are completely reversible. The calibration element can of course also be configured such that deformations of the calibration element due to contact-probing with a pressure that is less than or equal to a maximum pressure are completely reversible. Thus an exclusively reversible deformation of the calibration element occurs when the calibration element is subject to such forces/pressures.

The proposed apparatus which comprises the calibration element and the retaining apparatus can of course also have the high mechanical hardness. In particular, the apparatus can be configured such that no or only a reversible positional change between calibration element and retaining apparatus occurs when it is subject to the previously explained forces/pressures.

Alternatively or cumulatively, the calibration element can have a previously determined mechanical strength. The mechanical strength here describes a mechanical resistance exhibited by the calibration element against plastic deformation or separation. The calibration element can here in particular have a predetermined compressive strength.

Further alternatively or cumulatively, the calibration element can have a predetermined mechanical abrasion resistance. The abrasion resistance here designates a resistance exhibited by the calibration element against mechanical abrasion. The calibration element can be configured for example such that no or only minimum mechanical abrasion occurs under contact-probing with a force that is less than or equal to a maximum force. The same applies to contact-probing with a pressure that is less than or equal to a maximum pressure.

The calibration element can consist, for example, at least partially of quartz glass, Zerodur, silicon, carbide, nitride or a technical oxide ceramic.

In one preferred embodiment, the calibration element consists of diamond. Diamond advantageously exhibits a high mechanical hardness, a high mechanical strength, a high mechanical abrasion resistance, an accurate processability, low coefficient of thermal expansion, and exactly known optical properties.

A further advantage of forming the calibration element from diamond is the chemical and physical pureness of diamond. The calibration element is preferably therefore formed from an artificial MCVD diamond (modified chemical vapor deposition diamond) or an AAA diamond or from a natural diamond of the highest tool quality or even jewelry quality grade. An AAA diamond here designates an artificial diamond of the highest quality grade.

A diamond in this case provides a homogeneous, highly pure and monocrystalline material, which is best suited to a physico-optical simulation, since it can be described easily in physicochemical terms and has only minor defects. Three-dimensional material mixtures, layering systems or alloys can, in comparison, be simulated only with relatively great uncertainty within the context of the previously explained rigorous optical simulation.

The calibration element can also exhibit a predetermined coefficient of thermal expansion. The coefficient of thermal expansion can in particular be less than a predetermined (low) coefficient of thermal expansion. This advantageously makes it possible for the geometric dimension of the calibration element to change as little as possible under the influence of temperatures.

Alternatively or cumulatively, the calibration element consists of hard metal. Further alternatively or cumulatively, the calibration element consists of a technical ceramic, in particular a carbide. These advantageously also exhibit high mechanical strength and abrasion resistance.

For these previously mentioned materials, processing methods exist that allow production of a body with dimensions that are determinable with high accuracy. For example when using diamond and hard metals, form deviations and surface qualities in the range of 10 to 100 nm can be achieved, in part even in the range below 10 nm. Such accuracies may be necessary to make possible stabilities and uncertainties in the range of less then 10 nm in compensating element calculations, as are regularly carried out in dimensional metrology and the calibration thereof.

The proposed materials advantageously allow the use of the apparatus according to the invention also for calibrating a tactile sensor. What is ensured here in particular is that the geometric dimensions do not change or change only minimally due to contact-probing, for example using a probe element. For example, no surface compressions due to probe forces that can lead to plastic deformation of a surface of the calibration element therefore occur.

In one preferred embodiment, the retaining apparatus has at least one opening, wherein the at least one calibration element is arranged at least partially above the opening. The opening is in particular a through-opening. This means that the opening is open on both sides, preferably toward an upper side and toward an underside of the retaining apparatus. In particular, the through-opening is not a blind hole opening.

The fact that at least one calibration element is arranged at least partially above the opening means that light that enters through the opening is incident on the calibration element. In particular, a central axis of the opening extending between both ends of the opening can be oriented parallel to the previously explained normal vector.

In other words, the arrangement of the calibration element above the opening means that the opening that is projected into the common projection plane and the calibration element that is projected into the common projection plane at least partially overlap in the common projection plane.

In particular, at least an edge or a partial section of an edge of the calibration element can be arranged above the opening.

The provision of an opening in the retaining apparatus and the corresponding arrangement of the calibration element advantageously permits the use of incident light and transmitted light to generate an image of the calibration element. Transmitted light here means light which strikes the image plane through the opening from a side of the retaining apparatus that is remote from the image plane of the image sensor. Accordingly, incident light means light which strikes the retaining apparatus and the calibration element from a side of the retaining apparatus that faces the image plane.

It is thus possible using the proposed apparatus to calibrate an optical sensor both in an incident light illumination scenario and in a transmitted light illumination scenario.

In one further preferred embodiment, the retaining apparatus has a plurality of openings, wherein the at least one calibration element is arranged at least partially above more than one of the openings. In particular, a plurality of edges or partial sections of a plurality of edges of the calibration element can be arranged at least partially above the openings.

As explained previously, this can mean that the edges of the calibration element are arranged at least partially in the region of the projected opening in the common projection plane.

As a result, more than one edge can be imaged both in an incident light and in a transmitted light illumination scenario. As a result, the calibration in such illumination scenarios is advantageously further improved.

The at least one opening can have different geometries. The opening can have, for example, a circular or polygonal cross section.

In one further embodiment, the retaining apparatus has a base body and at least one retaining block, wherein the retaining block is connected to the base body via at least one retaining web that is cut free. Cut free here means that the retaining web delimits an opening on both sides or is arranged in an opening, for example projects into the opening, at least in one section of said retaining web. The retaining web thus designates a section of the retaining apparatus that is delimited on both sides by one or more openings. One or more openings are thus arranged on both sides of the at least one section of the retaining web.

The calibration element can be arranged on the retaining block of the retaining apparatus. When projected into the common projection plane, the retaining block can here have smaller external dimensions than minimum or maximum spatial dimensions of the calibration element that is projected into the common projection plane.

Due to the formation of retaining webs, the retaining apparatus can advantageously be manufactured as simply as possible such that stable holding of the calibration element is possible, while at the same time the previously explained arrangement of at least one part of the calibration element being above one or more openings of the retaining apparatus is ensured.

The retaining block can also have an opening, for example a central opening. In this case, the calibration element can also be arranged above this opening of the retaining block.

In one further embodiment, a corner or an edge of the calibration element is arranged above the at least one retaining web. A corner here designates a point of intersection between two or more edges of the calibration element.

According to the previous embodiments, the term "above" means that the edge or corner of the calibration element that is projected into the common projection plane is arranged within the web that is projected into the common projection plane or arranged on a boundary of the web that is projected into the common projection plane.

That means that in a transmitted light illumination scenario, the corner or the edge of the calibration element is covered by the at least one web.

If one corner is arranged above the at least one web, at least partial sections of two edges of the calibration element can be covered by the web. In this case, however, a stable mechanical mounting of the calibration element on the retaining apparatus is the result.

If only one edge and no corner is arranged above the web, at least one corner formed by said edge can be arranged above the opening of the retaining apparatus. In this case, the edge can thus advantageously be imaged well in a transmitted light illumination scenario. Since an imaged corner represents a feature that is to be determined in image-based fashion simply, accurately and robustly, the determination of optical dimensions can thus be advantageously improved.

In one further embodiment, the retaining apparatus has at least one edge, wherein the edge that is projected into the common projection plane overlays with no other edge of the retaining apparatus that is projected into the projection plane. In addition, it is of course possible for the edge of the retaining apparatus that is projected into the common projection plane to overlay with none of the edges of the calibration element that are projected into the common projection plane.

This advantageously results in edges of the retaining apparatus being capable of being uniquely identified in image-based fashion. As a result, optical measurement can be improved since, for example, methods of edge detection can also be used to detect edges of the retaining apparatus and determine image-based dimensions.

In one further embodiment, the at least one edge is an edge that delimits the at least one opening. This advantageously results in the at least one edge being uniquely imagable both in transmitted light and in incident light illumination scenarios.

According to the configuration of the calibration element, it is possible that the edge is formed by two planar surface sections of the retaining apparatus that intersect one another under an acute angle, in particular an angle within the previously cited angle range of 0° to less than 90°.

In one further embodiment, the retaining apparatus has a plurality of mutually parallel, planar surface sections, which are arranged, spaced apart from one another with a predetermined distance, along the normal vector. The calibration element can here be arranged on one of said planar surface sections. Advantageously, this results in said planar surface sections being capable of being measured both in optical and tactile fashion, with actual spatial distances of said surface sections being previously known.

In general, the retaining apparatus can also have previously known geometric dimensions. By way of example, the openings in the retaining apparatus can have previously known dimensions, for example diameters. Thus, the retaining apparatus can also be used for calibrating the coordinate-measuring machine, in particular for calibrating a tactile sensor of the coordinate-measuring machine.

In one further embodiment, the apparatus comprises at least one further calibration element. This can be configured in the same manner as the first calibration element. In particular, the further calibration element can have the same geometric and physico-optical properties as the first calibration element.

The further calibration element can here be arranged on a further surface section of the retaining apparatus. The further calibration element can here be arranged, with a predetermined distance from the first calibration element, on the retaining apparatus. As a result, an air gap having previously known dimensions can be present between the calibration elements. As a result, the calibration elements enclose a "sunk" structure which can be measured both in optical and tactile fashion.

With respect to the surface section of the retaining apparatus, on which the calibration element or elements is/are arranged, the calibration element or elements forms/form in each case one elevated structure which can likewise be measured in optical and tactile fashion.

This advantageously makes possible a calibration for the measurement of internal and external dimensions according to a known measurement of ring gauges or plug gauges.

In one further embodiment, the apparatus comprises at least one further calibration element, wherein the further calibration element has an at least partially ball-shaped partial element.

The further calibration element can be formed, for example, as a ball-shaped calibrating standard. This advantageously permits the use of known calibration methods for calibrating an in particular tactile sensor of the coordinate-measuring machine.

In one further embodiment, the apparatus comprises at least one further calibration element, wherein the at least one further calibration element is configured as a calibration pattern or comprises a calibration pattern, wherein the calibration pattern is configured as a structured layer. The calibration pattern is configured in particular as a structured layer produced using electron beam lithography. The structured layer can in particular consist of an electron-beam-sensitive material. The calibration pattern can here have previously known dimensions in the nanometer range, wherein a position error of the calibration pattern can be less than 20 nm. The calibration pattern can also additionally be measured using what is known as a mask registration device. This permits determination of dimensions in the nanometer range having a measurement uncertainty in the range of a few tens of nanometers.

By way of example, the calibration pattern can have elevated and/or sunk regions with respect to, for example, a surface section of the calibration element or the retaining apparatus or a reference surface of the calibration pattern, with dimensions of these regions being previously known.

The calibration pattern can thus be advantageously used to calibrate in particular an optical sensor. What should be noted, however, is that such calibration patterns generally only allow calibration for two-dimensional and not three-dimensional measurement, since depth information, in particular a height of the elevated or sunk regions, are not known or capturable.

Advantageously, methods of the rigorous optical simulation for approximately planar calibration patterns, for example in the form of web width measurements, are known. This thus permits exact simulation of an image of the calibration pattern by an optical sensor and thus the previously already explained compensation of imaging effects which occur during the actual optical capturing and make the optical measurement more difficult.

In one further embodiment, the calibration pattern has at least one opening, wherein a maximum diameter of the opening is smaller then a resolution limit of an optical capturing device or of an optical sensor of the coordinate-measuring machine.

As a result it is advantageously possible to carry out an examination of the image capturing device and of further optical elements that are, if appropriate, associated therewith, such as for example a lens. By way of example, what are known as phase retrieval methods can be ascertained from focusing imaging errors of the optical capturing device.

Such methods are known for example from H. Gross et al., Characterization of Complex Optical Systems Based on Wavefront Retrieval from Point Spread Function, Proc. EOS Topical Meeting, Lille, 2007.

In one further embodiment, the apparatus comprises at least two sections with mutually different coefficients of thermal expansion, wherein the sections are configured such that a difference of predetermined geometric dimensions of said sections is uniquely associated with a temperature. For example, at a reference temperature, for example 20° C., the sections can have at least one identical corresponding geometric dimension, for example a length. If the temperature rises or falls above/under the reference temperature, this geometric dimension changes depending on the section-specific coefficient of expansion. The difference between the geometric dimensions here uniquely represents the corresponding temperature difference with respect to the reference temperature and thus also the absolute temperature.

This advantageously permits the determination of a temperature of the proposed apparatus through the determination of the corresponding dimensions.

Also proposed is a method for calibrating a coordinate-measuring machine, in particular a multifunction coordinate-measuring machine, which makes possible both optical and tactile measurement. Here, at least one apparatus according to one of the previously explained embodiments is arranged within a measurement volume or measurement range of an optical and/or tactile sensor of the coordinate-measuring machine. The at least one apparatus is further measured using the sensor of the coordinate-measuring machine. This means that geometric dimensions of the apparatus, in particular of the at least one calibration element, are determined. This can be done for example by way of the previously explained contact-probing using a tactile sensor and/or by way of optical measurement using the previously explained optical sensor or the optical capturing device.

Furthermore, at least one parameter that influences the measurement result is determined in dependence on the measurement result and in dependence on previously known dimensions of the apparatus.

With respect to the optical measurement by way of an optical capturing device, parameters of methods of image processing that are used for determining image-based geometric dimensions can be determined, for example. By way of example, parameters of methods for edge detection can be determined. Likewise, a conversion factor between an image-based geometric dimension and an actual dimension can be determined.

The same is true, of course, for the calibration of a tactile sensor.

In one further embodiment, the apparatus is measured optically. This means that images of the apparatus are generated and features of the apparatus are determined in image-based fashion, wherein geometric dimensions of the apparatus are determined in image-based fashion in dependence on the features and compared to the previously known dimensions.

It is also possible to generate a virtual image of the apparatus in dependence on physico-optical properties of the apparatus, for example by way of the previously explained rigorous optical simulation. On the basis of a comparison of the actual image, which was generated using the optical capturing device, with the virtual image, it is then possible to determine an uncertainty of an optical measurement. Said uncertainty can be subsequently used to make a correction in an optical measurement or to estimate an uncertainty interval in the optical determination of geometric dimensions.

In one further embodiment, the apparatus is measured in tactile fashion. By way of example, the at least one calibration element can be measured in tactile fashion. It is possible here, for example, to determine whether the apparatus indeed has the dimensions that are previously known and thus to be expected. The tactile measurement can be used in particular to verify dimensions of the apparatus which, as previously explained, is then optically measured and of which a virtual image is generated.

In one further embodiment, a difference of predetermined geometric dimensions of at least two sections of the apparatus having mutually different coefficients of thermal expansion is determined, wherein a temperature of the apparatus is determined in dependence on the difference. This advantageously enables determination of a temperature of the apparatus.

BRIEF DESCRIPTION OF THE SEVERAL VIEWS OF THE DRAWING

The invention will be explained in more detail with reference to an exemplary embodiment. In the figures.

DESCRIPTION OF THE INVENTION

In the following text, identical reference signs designate elements having identical or similar technical features.

Figure 1:
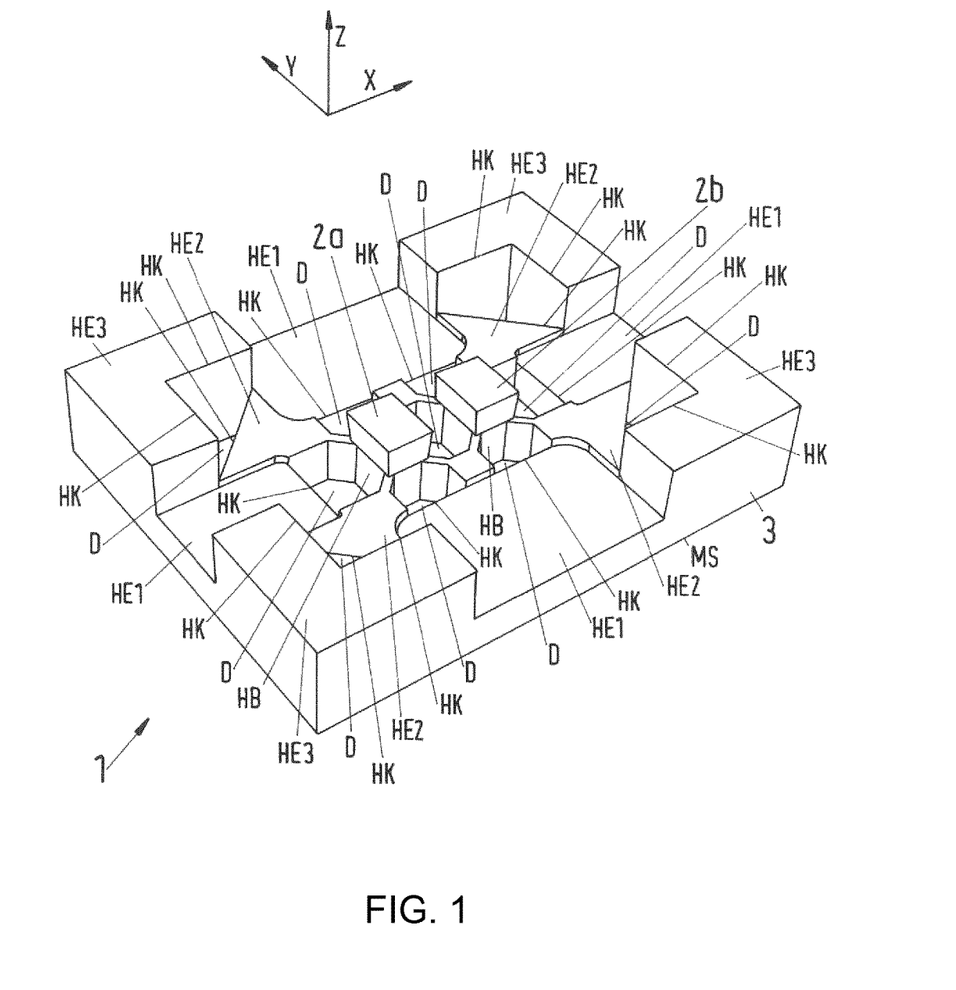
FIG. 1 shows a perspective view of an apparatus according to the invention.

FIG. 1 illustrates a perspective view of an apparatus 1 according to the invention. The apparatus 1 comprises a first calibration element 2a and a second calibration element 2b. The apparatus 1 furthermore comprises a retaining apparatus 3.

Also shown is a coordinate system to which reference will be made below. Thus, a first horizontal direction x and a further horizontal direction y that is orthogonal thereto are shown. A vertical direction z that is orthogonal to both horizontal directions x, y is shown. The directions x, y, z form a Cartesian coordinate system.

The retaining apparatus has a plurality of mutually parallel planar surface sections HE1, HE2, HE3. Said surface sections HE1, HE2, HE3 are spaced apart with a previously known distance in the vertical direction z. The vertical direction z is here oriented orthogonally to all of said planar surface sections HE1, HE2, HE3. The vertical direction z thus corresponds to a normal vector of the surface sections HE1, HE2, HE3 of the retaining apparatus 3.

A first surface section HE1 is thus arranged along the vertical direction z below a second surface section HE2 of the retaining apparatus 3, wherein the second surface section HE2 in turn is arranged below a third surface section HE3.

The calibration elements 2a, 2b are arranged on the second surface section HE2. Here, a base side KGS (see for example FIG. 4a) of the respective calibration elements 2a, 2b rest on the second surface section HE2 of the retaining apparatus 3.

The calibration elements 2a, 2b are configured in the form of a truncated pyramid, wherein the truncated pyramid has a rectangular base area. The calibration elements 2a, 2b are here arranged on the retaining apparatus 3 such that a cross section of the calibration elements 2a, 2b increases in size in the vertical direction z.

A distance, which changes along the vertical direction z, along the first horizontal direction x between the two calibration elements 2a and 2b, in particular between mutually facing lateral faces KSF of the calibration elements 2a, 2b, is previously known.

The retaining apparatus 3 has a plurality of through-openings D. These through-openings D extend here in the vertical direction z from an underside MS of the retaining apparatus 3 up to an upper side that is formed by the planar surface sections HE1, HE2, HE3 of the retaining apparatus 3.

The retaining apparatus 3 has a plurality of edges. These edges are formed in each case as intersecting lines of non-curved planes, whereby the intersecting planes are not perpendicular to one another. In particular, the planar surface sections of the retaining apparatus 3 forming the edges enclose an acute angle. Some of the edges here delimit a through-opening D of the retaining apparatus 3.

FIG. 1 furthermore illustrates that part of the calibration elements 2a, 2b extends above in each case a total of four through-openings D of the retaining apparatus 3. That means that part of the respective calibration element 2a, 2b is arranged inside the through-opening D in a common projection plane (not illustrated) that is arranged orthogonally to the vertical direction z. The calibration elements 2a, 2b are furthermore arranged in the vertical direction z above the through-openings D.

In a transmitted light illumination scenario, the apparatus 1 can be illuminated from the underside MS of the retaining apparatus 3. Here, light can radiate through the through-opening D. An image plane (not illustrated) of an optical capturing device of a coordinate-measuring machine can be arranged on a side facing the upper side of the apparatus 1, and can be orientated in particular also orthogonally to the vertical direction z. The through-opening D and the arrangement of the calibration elements 2a, 2b above the through-openings D permit the imaging of edges KK of the calibration elements 2a, 2b (here for example FIG. 4a) into the previously explained image plane.

Figure 2:
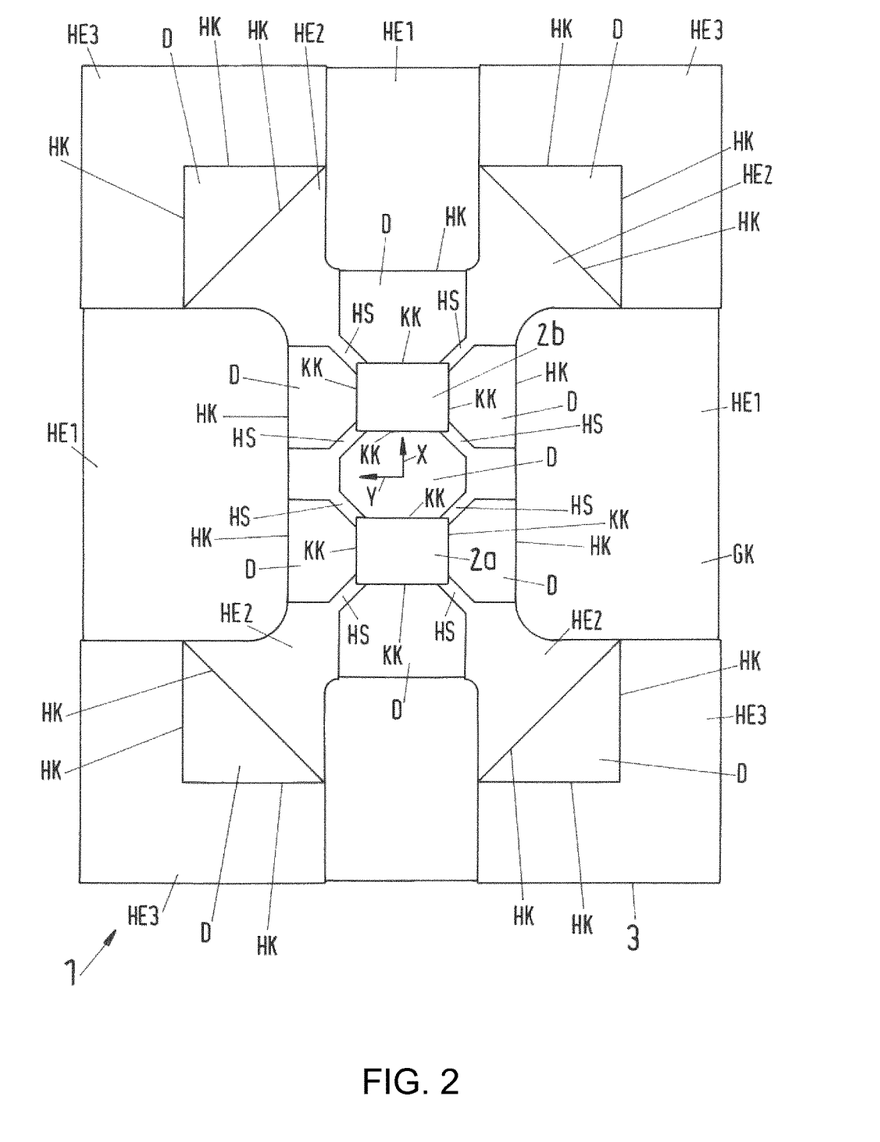
FIG. 2 shows a plan view of the apparatus illustrated in FIG. 1.

Retaining blocks HB, which will be explained in more detail with reference to FIG. 2, are also illustrated.

FIG. 2 illustrates a plan view of the apparatus 1 illustrated in FIG. 1. It can be seen here that the retaining apparatus 3 has retaining webs HS, which connect a base body GK of the retaining apparatus 3 with retaining blocks HB (see FIG. 1). The retaining webs HS are retaining webs HS that have been cut free and are surrounded on both sides by through-openings D. The base body GK, the retaining webs HS and the retaining blocks HB thus fully enclose through-openings D of the retaining apparatus 3.

Also shown is that corners of the calibration elements 2a, 2b, which are formed by edges KK of the calibration elements 2a, 2b, are arranged above the retaining webs HS. These corners are therefore not imagable into the image plane in the previously explained transmitted light illumination scenario.

Also feasible is that the retaining webs HS are arranged such that only a partial section of an edge KK and no corner are arranged above a retaining web HS. What can be achieved here is that the corners in the transmitted light illumination scenario can be imaged into the image plane.

Figure 3:
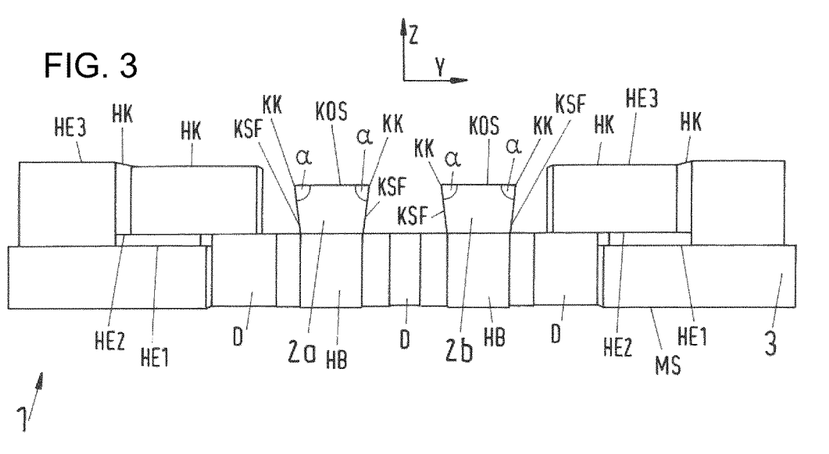
FIG. 3 shows a longitudinal section through the apparatus illustrated in FIG. 1.

FIG. 3 shows a longitudinal section through the apparatus 1 illustrated in FIG. 1. It illustrates in particular that upper edges KK of the calibration elements 2a, 2b are formed as intersecting lines of two planar surface sections of the calibration elements 2a, 2b that intersect one another under an acute angle $\alpha$ in the vertical direction z. If light is emitted, for example, having a beam direction that is parallel to the vertical direction z onto the apparatus 1 or is radiated from the underside MS of the apparatus 1 through the apparatus 1, said edges KK are uniquely imaged into an image plane that can be oriented orthogonally to the vertical direction z and overlay with no further edges KK of the apparatus 1. Similar is true for the edges HK of the retaining apparatus 3. The edges KK of the calibration elements 2a, 2b, illustrated in FIG. 3, are formed by an upper side KOS of the respective calibration element 2a, 2b and by lateral faces KSF of the calibration elements 2a, 2b. Here, the upper side KOS and the lateral faces KSF form in each case planar surface sections of the calibration elements 2a, 2b. The intersection angle $\alpha$, under which the upper side KOS and the lateral faces KSF intersect, lies within an angle range of 80° to less than 90°.

Figure 4A:
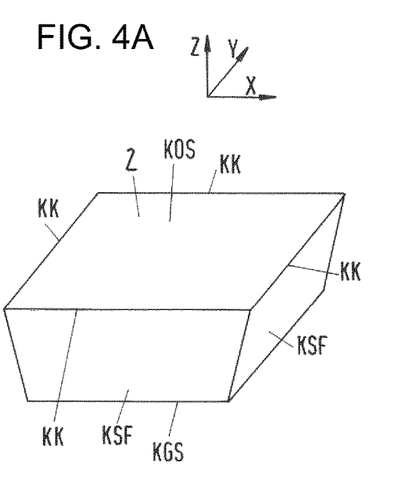
FIG. 4a shows a perspective view of a calibration element.

FIG. 4a illustrates a perspective view of a calibration element 2. The calibration element is configured in the form of a truncated pyramid and has a base side KGS, an upper side KOS and lateral faces KSF. The sides are here configured as planar surface sections of the calibration element 2. What is shown is that the lateral faces KSF are inclined with respect to the upper side KOS and the base side KGS. The lateral faces KSF here intersect the upper side KOS in each case under an acute angle $\alpha$ and form edges KK of the calibration element 2. This forms the edges KK as intersecting lines of two planes that are not oriented orthogonally with respect to one another.

The calibration element 2 illustrated in FIG. 4a has previously known physico-optical properties that permit calculation of interactions of the calibration element 2 with light. The calibration element 2 is preferably formed from diamond, which forms an isotropic, non-conductive material. At the same time, the calibration element 2 that is formed from diamond has a high mechanical hardness, a high mechanical strength and a high mechanical abrasion resistance. The calibration element 2 that is formed from diamond at the same time has a low coefficient of thermal expansion.

The retaining apparatus 3 can likewise be formed from diamond. The retaining apparatus 3, however, preferably consists of hard metal or ceramic.

Figure 4B:
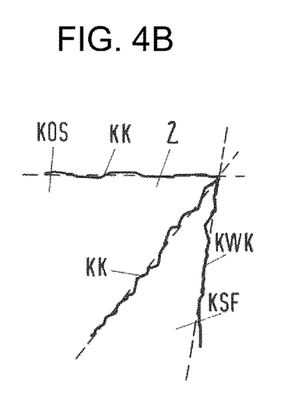
FIG. 4b shows a schematic edge profile of the calibration element illustrated in FIG. 4a, FIG. 5 shows a schematic cross section through a calibration element.

FIG. 4b schematically shows an actual profile of edges KK of the calibration element 2 illustrated in FIG. 4a and a profile of the edges KK that can be determined in image-based fashion.

The actual profile of the edges KK and of a further edge KWK that is formed by lateral faces KSF is shown by solid lines. If the calibration element 2 is imaged by an optical capturing device of a coordinate-measuring machine, it is possible for example to determine in image-based fashion the profile of the edges KK, KWK that is illustrated by solid lines. Dashed lines in FIG. 4B show an ideal profile of the edges KK, KWK that can be determined in image-based fashion. The ideal profile can be determined for example as a best fit line related to the actual profile of the edges KK.

Figure 5:
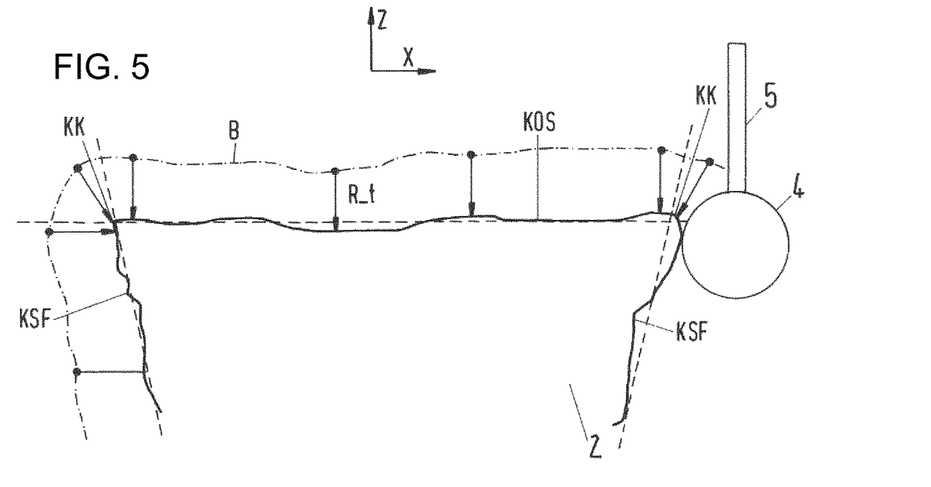

FIG. 5 shows a schematic longitudinal section through a calibration element 2, wherein in particular an upper side KOS and lateral faces KSF of the calibration element 2 are shown. Also shown are edges KK which are formed by lateral faces KSF and the upper side KOS. A solid line represents an actual profile or an actual topography of the upper side KOS and of the lateral faces KSF. What is shown here is that they are not configured to be completely planar.

Also illustrated is a probe ball 4 which is attached at a free end of a probe pen 5. The probe pen 5 in turn can be attached to a probe head (not illustrated) of a coordinate-measuring machine. The probe head 4 and the probe pen 5 here form a tactile sensor for measuring the calibration element 2. Illustrated is a track B, along which a center point of the probe ball 4 moves during the contact-probing of the upper side KOS and of the lateral faces KSF. The track B is here offset by a radius $R\_t$ from the upper side KOS or the lateral face KSF in each case in the direction of a normal vector on the upper side KOS or the lateral face KSF. The topography of the calibration element 2 can then be determined in dependence on the positions of the center point of the probe ball 4 along the track B. Solid lines represent an ideal profile of the upper side KOS or of the lateral faces KSF, which can be determined in dependence on the measurement points along the track B.

The calibration element 2 can thus be used both for optical and tactile measurement, wherein advantageously a multifunction coordinate-measuring machine can be calibrated using the calibration element 2.

Figure 6:
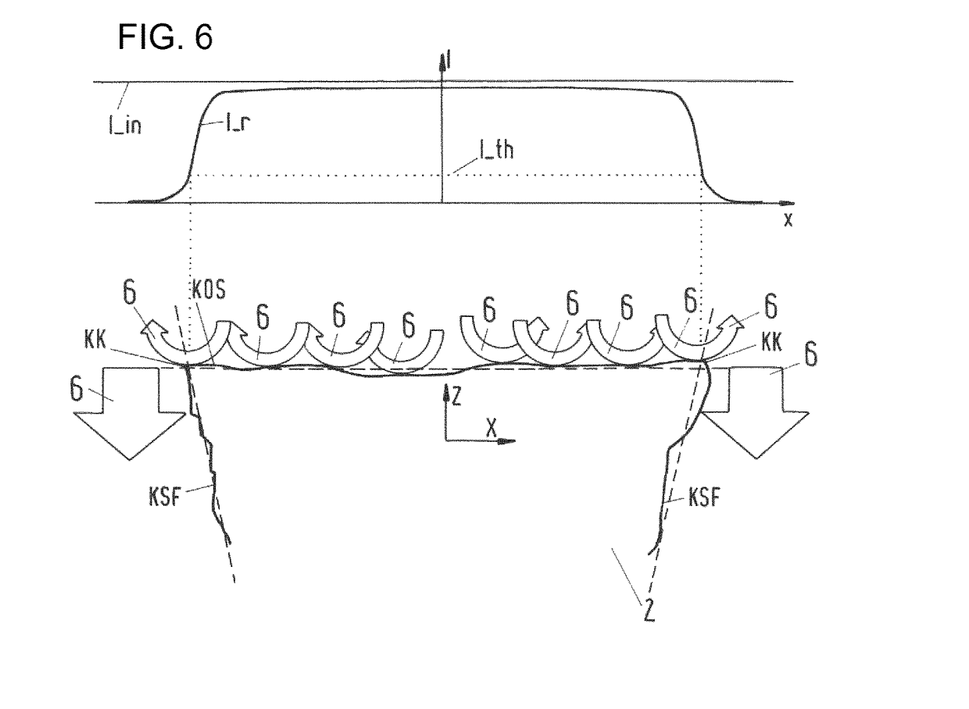
FIG. 6 shows a schematic cross section through a calibration element and a corresponding intensity profile in a bright field incident light illumination scenario.

FIG. 6 illustrates a schematic cross section through a calibration element 2 and an intensity profile I along the first horizontal direction x in a bright field incident light condition. Here, light 6 strikes the calibration element 2 from the upper side KOS. Components of the light 6 are reflected here, which is illustrated by curved arrows. The reflected components of the light 6 can be captured by an optical capturing device and imaged, for example, on an image sensor that can form an image plane.

Also illustrated is an exemplary intensity profile of the light 6 captured using the image sensor along the first horizontal direction x. Illustrated is a first light intensity $I\_in$, which represents an intensity of the incident light 6. Also illustrated is an intensity profile $I\_r$, which represents the intensity of the reflected light. What can be seen here is that in the region of the edges KK, which are formed by the upper side KOS and the lateral faces KSF, the intensity $I\_r$ of the reflected light 6 increases and in the region of the calibration element 2 assumes a higher value than outside the calibration element 2. Also illustrated is an intensity threshold $I\_th$, wherein in the bright field incident light illumination scenario, the edges KK or the locations of the edges KK are detected in image-based fashion if the intensity $I\_r$ of the reflected light 6 intersects the intensity threshold $I\_th$.

Figure 7:
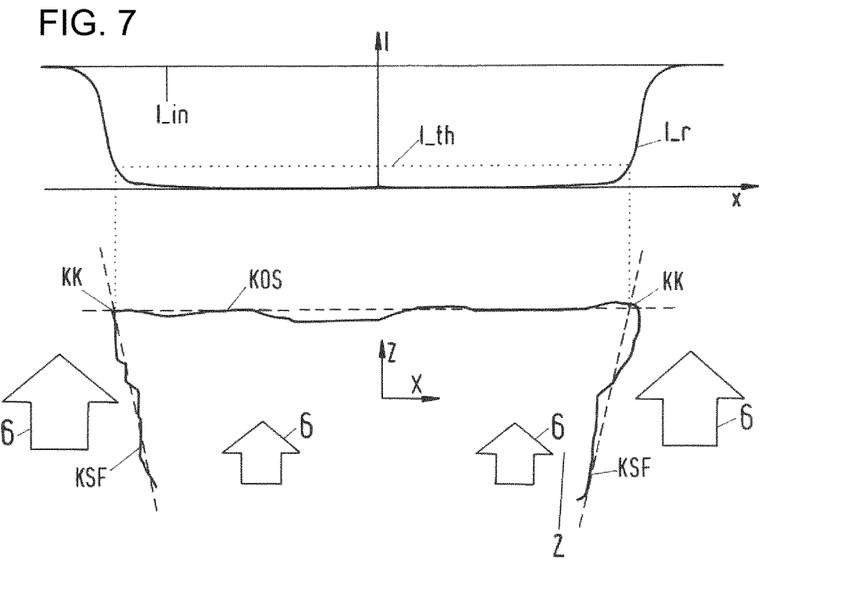
FIG. 7 shows a schematic cross section through a calibration element and a corresponding intensity profile in a bright field transmitted light illumination scenario.

FIG. 7 illustrates a schematic cross section through a calibration element 2 in a bright field transmitted light illumination scenario and a corresponding intensity profile in the first horizontal direction x. In this case, light 6 radiates from an underside of the calibration element 2, that is to say from the base side KGS of the calibration element 2 illustrated in FIG. 4a, through the calibration element 2 and past the calibration element 2.

This shows that a beam direction of the light 6 is oriented parallel to the vertical direction z.

Also illustrated is an intensity profile I in the first horizontal direction x, which profile is generated for example by an image sensor (not illustrated) of an optical capturing device, wherein the optical capturing device generates an image of the calibration element 2 in the bright field transmitted light illumination scenario.

Illustrated is an intensity $I\_in$ of the transmitted light. Also illustrated is an intensity profile $I\_r$ that is generated by the image sensor. Likewise illustrated is an intensity threshold $I\_th$ for edge detection. What can be seen here is that in the region of the edges KK, which are formed by the upper side KOS and the lateral faces KSF of the calibration element 2, the intensity $I\_r$ drops from the incoming intensity $I\_in$ to a value below the intensity threshold $I\_th$ and in the region of the calibration element 2 has a lower value than outside the calibration element 2. A location of the edge KK can then be determined in image-based fashion in dependence on the intersection point of the intensity threshold $I\_th$ with the intensity profile $I\_r$.

Figure 8:
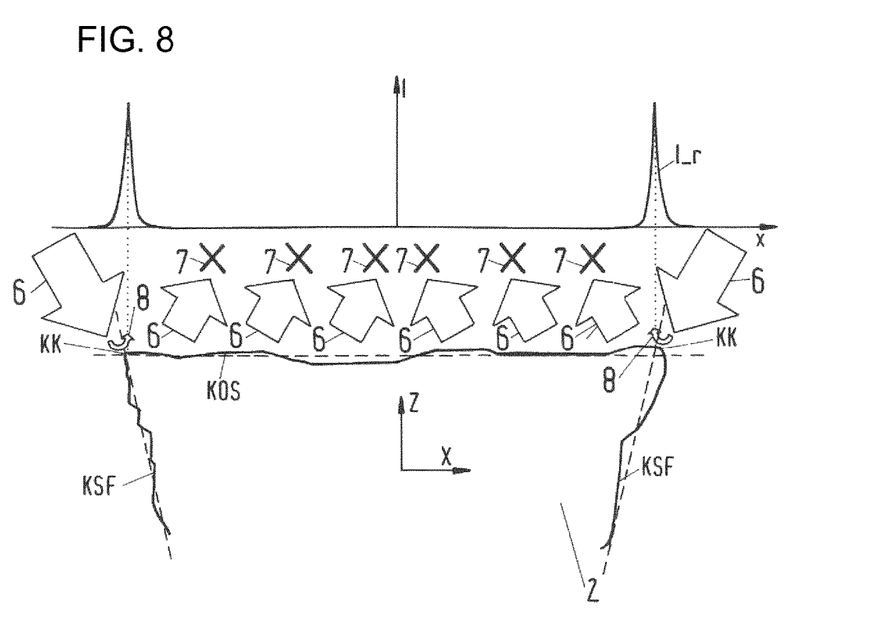
FIG. 8 shows a schematic cross section through a calibration element and a corresponding intensity profile in a dark field incident light illumination scenario.

FIG. 8 illustrates a schematic cross section through a calibration element 2 in a dark field incident light illumination scenario and a corresponding intensity profile in the first horizontal direction x. Light 6 here strikes the calibration element 2 from an upper side KOS of the calibration element 2 such that no direct reflection occurs. An image sensor of an optical capturing device captures in this case only scattered light 8, which is scattered by the calibration element 2.

This is illustrated schematically by way of crosses 7, which indicate that no direct reflection of light 6 takes place.

What can be seen in the corresponding intensity profile $I\_r$ of the scattered light 8 along the first horizontal direction x is that in the region of the edges KK, which are formed by the upper side KOS and the lateral faces KSF of the calibration element 2, intensity peaks occur. The intensity profile $I\_r$ thus has an intensity maximum in the region of an edge KK, as a result of which the location of the edge KK can be detected in image-based fashion simply and reliably.

The invention claimed is:

1. An apparatus for calibrating a multisensor coordinate-measuring machine, the apparatus comprising:
   at least one calibration element having a plurality of surface sections, mutually abutting ones of said surface sections forming an edge;
   at least one retaining apparatus having surface sections, said calibration element disposed on one of said surface sections of said retaining apparatus, said calibration element and said retaining apparatus being mechanically connected to each other in one of a releasable manner or a non-releasable manner;
   said surface sections of said calibration element are disposed with respect to one another such that said calibration element has at least one said edge which does not overlay with any other edge of said calibration element when said edge and said other edge are projected into a common projection plane, the common projection plane being oriented orthogonally to a normal vector of said one surface section of said retaining apparatus; and
   said retaining apparatus having an upper surface and an opposite bottom surface and at least one through opening formed therein and said through opening extending entirely through said retaining apparatus from said bottom surface through said upper surface, said bottom surface defining a bottom of the apparatus, wherein said at least one calibration element is disposed at least partially above said through opening such that an image of said at least one calibration element is generated by using incident light and transmitted light propagating through the at least one through opening entirely, and said calibration element is configured for calibrating the multisensor coordinate-measuring during a measuring process where said through opening is unobstructed at least in parts during the measuring process.

2. The apparatus according to claim 1, wherein said calibration element is in a form of a truncated pyramid.

3. The apparatus according to claim 1, wherein said calibration element has previously known optical properties.

4. The apparatus according to claim 3, wherein at least one of diffusing properties, diffraction properties, reflection properties, or transmission properties of said calibration element are previously known.

5. The apparatus according to claim 1, wherein said calibration element is formed of an isotropic material.

6. The apparatus according to claim 1, wherein said calibration element is formed of a non-conductive material.

7. The apparatus according to claim 1, wherein said calibration element has at least one of a predetermined mechanical hardness, a predetermined mechanical strength, a predetermined mechanical abrasion resistance or a predetermined coefficient of thermal expansion.

8. The apparatus according to claim 1, wherein said calibration element has at least one material selected from the group consisting of diamond, hard metal and ceramic.

9. The apparatus according to claim 1, wherein said retaining apparatus has a plurality of through openings formed therein, said calibration element is disposed at least partially above at least two of said through openings.

10. The apparatus according to claim 1, wherein said retaining apparatus has at least one retaining web, a base body and at least one retaining block, said retaining block is connected to said base body via said at least one retaining web that is cut free.

11. The apparatus according to claim 10, wherein a corner or said edge of said calibration element is disposed above said at least one retaining web.

12. The apparatus according to claim 1, wherein said retaining apparatus has at least one edge, said edge of said retaining apparatus overlays with no other edge of said retaining apparatus in the common projection plane.

13. The apparatus according to claim 12, wherein said at least one edge of said retaining apparatus is an edge that delimits said at least one through opening.

14. The apparatus according to claim 1, wherein said retaining apparatus has a plurality of mutually parallel, planar surface sections which are disposed such that said plurality of mutually parallel, planar surface sections are spaced apart from one another along the normal vector.

15. The apparatus according to claim 1, wherein said at least one calibration element includes at least one first calibration element and at least one second calibration element, said first and second calibration elements disposed on different ones of said surface sections of said retaining apparatus.

16. A method for calibrating a coordinate-measuring machine, which comprises the steps of:
providing an apparatus according to claim 1;
disposing the apparatus in a measurement volume of a sensor of the coordinate-measuring machine;
measuring the at least one apparatus via the sensor of the coordinate-measuring machine and during the measuring step the through opening is unobstructed at least in parts; and
determining at least one parameter that influences a measurement result in dependence on the measurement result and previously known dimensions of the apparatus.

17. The method according to claim 16, wherein the apparatus is measured optically.

18. The method according to claim 17, which further comprises:
calculating a virtual image of the apparatus in dependence on optical properties of the apparatus;
comparing the virtual image to a corresponding image of the apparatus, the corresponding image being generated by an optical capturing device of the coordinate-measuring machine; and
determining an inaccuracy of an optical measurement in dependence on a comparison.

19. The method according to claim 16, wherein the apparatus is measured in a tactile fashion.

20. The method according to claim 16, which further comprises:
determining a difference of predetermined geometric dimensions of at least two sections of the apparatus having mutually different coefficients of thermal expansion; and
determining a temperature of the apparatus in dependence on the difference.

21. An apparatus for calibrating a multisensor coordinate-measuring machine, the apparatus comprising:
at least one calibration element having a plurality of surface sections, mutually abutting ones of said surface sections forming an edge;
at least one retaining apparatus having surface sections, said calibration element disposed on one of said surface sections of said retaining apparatus, said calibration element and said retaining apparatus being mechanically connected to each other in one of a releasable manner or a non-releasable manner;
said surface sections of said calibration element are disposed with respect to one another such that said calibration element has at least one said edge which does not overlay with any other edge of said calibration element when said edge and said other edge are projected into a common projection plane, the common projection plane being oriented orthogonally to a normal vector of said one surface section of said retaining apparatus;
two mutually different surface sections of said surface sections of said calibration element intersect under an acute angle; and
said retaining apparatus having at least one through opening formed therein, wherein said at least one calibration element is disposed at least partially above said through opening, and said calibration element is configured for calibrating the multisensor coordinate-measuring.

22. The apparatus as claimed in claim 21, wherein the acute angle lies in an angle range of greater than 0° to less than 90°.

* * * * *